United States Patent
Siedlik et al.

(10) Patent No.: US 12,165,407 B2
(45) Date of Patent: Dec. 10, 2024

(54) SYSTEM AND METHOD FOR PRESENTING STATEMENTS CAPTURED AT AN INCIDENT SCENE

(71) Applicant: MOTOROLA SOLUTIONS, INC., Chicago, IL (US)

(72) Inventors: Jakub Siedlik, Tarnow (PL); Maciej Stawiszynski, Cracow (PL); Szymon Sikora, Cracow (PL); Pawel Pak, Adamow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 630 days.

(21) Appl. No.: 17/304,575

(22) Filed: Jun. 23, 2021

(65) Prior Publication Data
US 2022/0414377 A1 Dec. 29, 2022

(51) Int. Cl.
*G06V 20/20* (2022.01)
*G06F 16/45* (2019.01)
(Continued)

(52) U.S. Cl.
CPC .............. *G06V 20/20* (2022.01); *G06F 16/45* (2019.01); *G06F 40/35* (2020.01); *G06V 40/70* (2022.01); *G10L 15/26* (2013.01)

(58) Field of Classification Search
CPC ........ G06V 20/20; G06V 40/70; G06F 16/45; G06F 40/35; G10L 15/26
See application file for complete search history.

(56) References Cited

U.S. PATENT DOCUMENTS 7,184,100 B1 2/2007 Wilf et al.
7,626,725 B2 12/2009 Fukusaka
(Continued)

FOREIGN PATENT DOCUMENTS

GB 2407445 A 4/2005
JP 5728374 B2 6/2015

OTHER PUBLICATIONS

Ermel, Justyna et al. : "Method for Identifying Witness on the Incident Scene to be Contacted by the Rescue Team Member", Motorola Solutions, Inc., 2020, all pages.

*Primary Examiner* — Chan S Park
*Assistant Examiner* — Devin J Dhooge
(74) *Attorney, Agent, or Firm* — Raguraman Kumaresan

(57) ABSTRACT

A process of presenting statements captured at an incident scene. First real-time multimedia streams captured corresponding to an incident scene are converted into digital statements. Each statement is tagged to a person identity that is determined based on a biometric attribute extracted from the multimedia streams. When a responder arrives at the incident scene, second real-time multimedia streams are captured corresponding to the incident scene and an identity of a person present at the incident scene is determined. If the identity of the person determined from the second multimedia streams matches with the person identity determined from the first multimedia streams, statements tagged to the person identity are selected and a post-arrival notification is generated for the responder indicating a presence of the person at the incident scene and including the selected statements. The notification is then provided via a visual and/or audio output device operated by the responder.

20 Claims, 6 Drawing Sheets

(51) Int. Cl.
*G06F 40/35* (2020.01)
*G06V 40/70* (2022.01)
*G10L 15/26* (2006.01)

(56) References Cited

U.S. PATENT DOCUMENTS

| | | |
|---|---|---|
| 9,064,186 B2 | 6/2015 | Kiaohu et al. |
| 9,336,675 B2 | 5/2016 | Miller et al. |
| 9,619,851 B1* | 4/2017 | McIntyre ............. H04N 23/661 |
| 10,419,312 B2 | 9/2019 | Alzraki et al. |
| 2002/0051077 A1 | 5/2002 | Liou et al. |
| 2006/0092327 A1 | 5/2006 | Hoashi et al. |
| 2009/0164427 A1* | 6/2009 | Shields .................... H04L 63/12 |
| | | 707/999.102 |
| 2012/0249797 A1* | 10/2012 | Haddick ................ G04G 21/04 |
| | | 701/491 |
| 2018/0176474 A1* | 6/2018 | Blanco .................. G06F 40/169 |
| 2019/0266414 A1* | 8/2019 | Stawiszynski ......... G06Q 50/26 |

* cited by examiner

SYSTEM AND METHOD FOR PRESENTING STATEMENTS CAPTURED AT AN INCIDENT SCENE

BACKGROUND

Information is vital for public safety services. Oftentimes a witness at an incident scene has information that a public safety officer such as a first responder would find useful while responding to an incident. However, witnesses may not always know that the information possessed by them would be useful for the responder. Further some witnesses may hesitate to approach the responder and share information about the incident. As the responder arrives at the incident, a crowd may be formed at the incident scene making it difficult for the responder to identify specific persons gathered at the incident scene as potential witnesses or as having useful or reliable information about the incident. Further, responders may need to deal with a large number of people approaching them at the same time to volunteer to share information about the incident. However, not everyone may have useful or relevant information for the responders.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
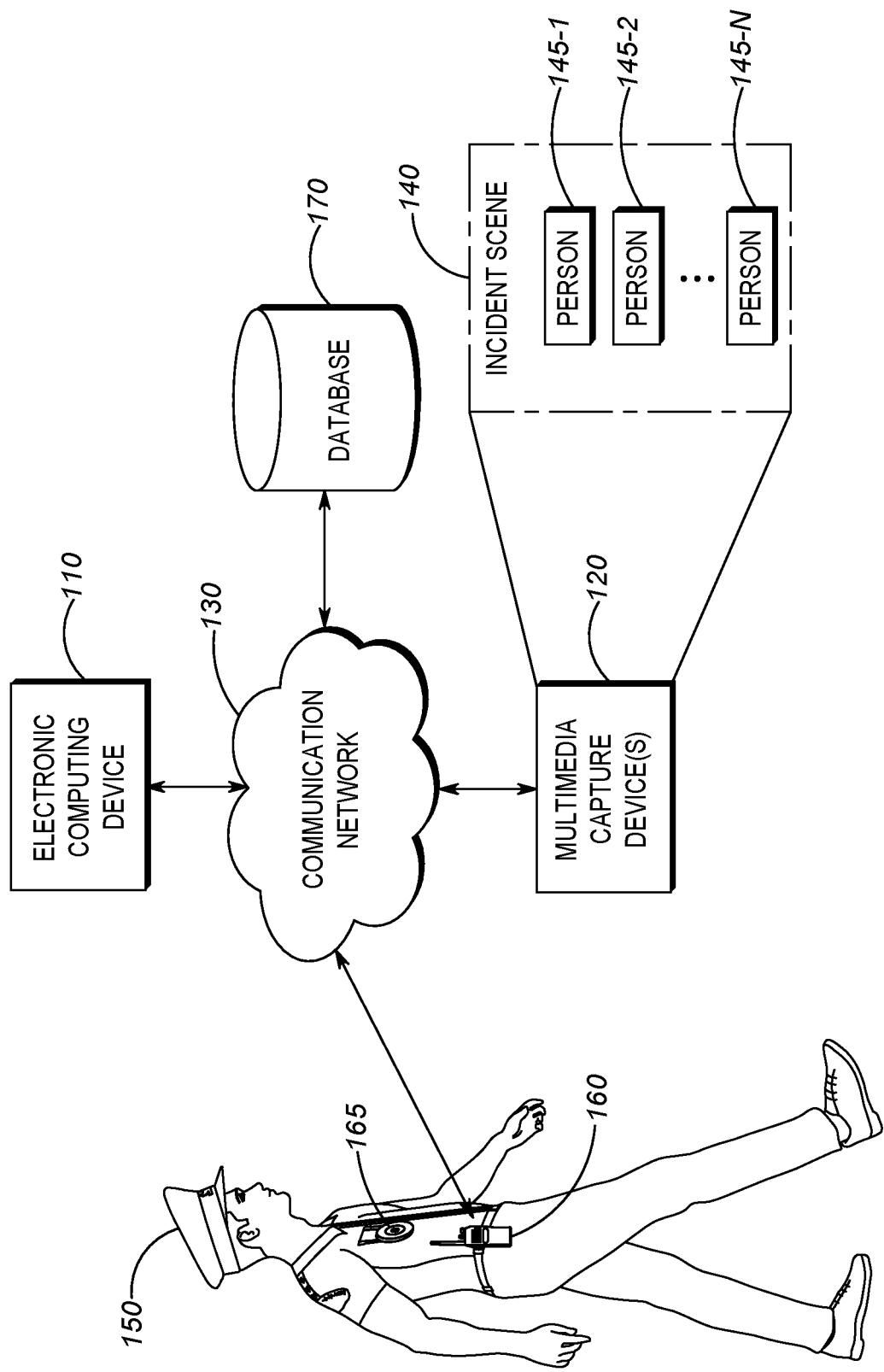
FIG. 1 is a block diagram of a system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

One embodiment provides a method of presenting statements captured at an incident scene. The method comprises: capturing, via one or more multimedia capture devices, one or more first real-time multimedia streams corresponding to an incident scene; converting the first real-time multimedia streams into a plurality of digital statements; tagging each of the plurality of digital statements to at least one of a plurality of person identities, each of the plurality of person identities determined based on at least one biometric attribute extracted from the first real-time multimedia streams; identifying a responder assigned to respond to an incident associated with the incident scene; determining that the responder has arrived at the incident scene and responsively capturing, via the one or more multimedia capture devices or at least one other multimedia capture device associated with the responder, one or more second real-time multimedia streams corresponding to the incident scene; extracting at least one biometric attribute from the second real-time multimedia streams to determine a person identity of a person present at the incident scene; determining that the person identity of the person present at the incident scene matches with a particular one of the plurality of person identities, and responsively selecting one or more of the plurality of digital statements that are tagged to the particular one of the plurality of person identities; generating a post-arrival notification for the responder indicating a presence of the person at the incident scene, the post-arrival notification including the selected one or more of the plurality of digital statements that are tagged to the person identity of the person; and providing a visual and/or audio output including the post-arrival notification via a visual and/or audio output device operated by the responder.

Another embodiment provides a system, comprising one or more multimedia capture devices and an electronic computing device communicatively coupled to the one or more multimedia capture devices. The electronic computing device is configured to: capture, via the multimedia capture devices, one or more first real-time multimedia streams corresponding to an incident scene; convert the first real-time multimedia streams into a plurality of digital statements; tag each of the plurality of digital statements to at least one of a plurality of person identities, each of the plurality of person identities determined based on at least one biometric attribute extracted from the first real-time multimedia streams; identify a responder assigned to respond to an incident associated with the incident scene; determine that the responder has arrived at the incident scene and responsively capture, via the multimedia capture devices or at least one other multimedia capture device associated with the responder, one or more second real-time multimedia streams corresponding to the incident scene; extract at least one biometric attribute from the second real-time multimedia streams to determine a person identity of a person present at the incident scene; determine that the person identity of the person present at the incident scene matches with a particular one of the plurality of person identities, and responsively select one or more of the plurality of digital statements that are tagged to the particular one of the plurality of person identities; generate a post-arrival notification for the responder indicating a presence of the person at the incident scene, the post-arrival notification including the selected one or more of the plurality of digital statements that are assigned to the person identity of the person; and provide a visual and/or audio output including the post-arrival notification via a visual and/or audio output device operated by the responder.

A further embodiment provides another method of presenting statements captured at an incident scene. The method comprises: capturing, via one or more multimedia capture devices, one or more real-time multimedia streams corresponding to an incident scene; converting the real-time multimedia streams into a plurality of digital statements; tagging each of the plurality of digital statements to at least one of a plurality of person identities, each of the plurality of person identities determined based on at least one biometric attribute extracted from the real-time multimedia streams; semantically processing each of the plurality of digital statements via a natural language processing engine to identify a respective set of keywords; retrieving incident information of an incident associated with the incident scene; retrieving responder information associated with a responder assigned to respond to the incident; assigning a priority to each of the plurality of digital statements based on a correlation between the respective set of keywords and one or more of the incident information and the responder information; selecting a subset of the digital statements based on comparing the priority assigned to each of the plurality of digital statements with a predefined priority threshold, wherein each of the digital statements included in the selected subset is tagged to a respective one of the plurality of person identities; generating a pre-arrival notification for the responder by ordering the digital statements included in the selected subset of the digital statements according to the priority assigned to each of the digital statements included in the subset; and providing a visual and/or audio output including the pre-arrival notification via a visual and/or audio output device operated by the responder.

Each of the above-mentioned embodiments will be discussed in more detail below, starting with example system and device architectures of the system in which the embodiments may be practiced, followed by an illustration of processing blocks for achieving an improved technical method, device, and system for presenting statements captured at an incident scene. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a system 100 is shown including an electronic computing device 110 configured to communicate with one or more multimedia capture devices 120 via one or more communication networks 130. The electronic computing device 110 is any infrastructure or client computing device that is adapted to present statements captured by the one or more multimedia capture devices 120 corresponding to an incident scene 140 to one or more responders 150 assigned to an incident associated with the incident scene 140. The electronic computing device 110 maintains or has access to a database 170 that stores information (e.g., type of incident, severity of incident, incident location etc.,) related to the incident and one or more responders 150 assigned to the incident. As an example, when an incident occurs at incident scene 140, a caller at incident scene 140 may make an emergency call to report the incident. An operator at a public safety answering point (not shown) may answer the emergency call and gather information about the incident. In response, a computer aided dispatch (CAD) computer (not shown) connected to the public safety answering point automatically or in response to an input from the operator, assigns an incident identifier (e.g., a computer aided dispatch (CAD) identifier) to the incident reported by the caller and further assigns/dispatches one or more first responders to respond to the incident based on one or more of the type of incident, severity of incident, and incident location. In any case, the incident information identifying information gathered from the caller and responder information identifying responders 150 assigned to the incident are stored at the database 170 and can be accessed by the electronic computing device 110 for executing one or more processes (see FIGS. 3 and 6) for presenting statements captured at the incident scene 140.

The multimedia capture devices 120 are fixed or portable electronic devices that can be deployed at different locations to capture real-time multimedia streams (e.g., audio and/or video streams), for example, corresponding to an incident scene 140. For example, the multimedia capture devices 120 include surveillance cameras, vehicle cameras, body-worn cameras, mobile device cameras, drone cameras, and the like that are capable of capturing in real-time both audio and video streams and video-only streams within its field-of-view. The multimedia capture devices 120 may additionally or alternatively include ambient-listening devices such as microphones that are capable of capturing audio-only streams including conversations between persons 145 (i.e., suspects, victims, witnesses, bystanders, onlookers, pedestrians, public-safety officers, etc.,) who may be present at the incident scene 140. The multimedia capture devices 120 may be owned, controlled, or operated by public-safety agencies as well as non-public safety agencies. In accordance with embodiments, the electronic computing device 110 has authorization to access real-time multimedia streams captured by one or more multimedia capture devices 120 corresponding to the incident scene 140.

One or more responders 150 assigned to respond to an incident (e.g., a burglary, a robbery, a homicide, a fire accident, automobile accident etc.,) associated with the incident scene 140 may include a police officer, a fire service responder, an emergency medical service responder, a detective, a crime scene investigator, a medical examiner, an evidence specialist, and the like. As an example, when an incident such as an automobile accident occurs at a particular location, a number of responders (e.g., an investigative officer, a paramedic, etc.,) may be dispatched to the incident location to investigate the accident as well as to provide medical treatment to persons injured in the accident. Each responder 150 may carry or operate a visual and/or audio output device 160 that may be implemented in any suitable combination of electronic devices, communication devices, computing devices, portable electronic devices, mobile computing devices, portable computing devices, tablet computing devices, smart phones, wearable communication devices, and mobile camera devices. The visual and/or audio output device 160 may also be incorporated into vehicles and the like, as a radio, an emergency radio, and the like. In some embodiments, the visual and/or audio output device 160 further includes other types of hardware for emergency service radio functionality, including, but not limited to, push-to-talk ("PTT") functionality. In some embodiments, the visual and/or audio output device 160 may be implemented as a smart glass which may be a virtual reality, an augmented reality, or a mixed reality glass that can be worn by a public safety officer while investigating an incident at an incident scene 140. In accordance with embodiments, digital statements captured from persons 145 present at the incident scene 140 are prioritized and presented to particularly selected responders 150 via their respective visual and/or audio output devices 160.

Although only one visual and/or audio output device 160 is shown in FIG. 1, the system 100 may include multiple visual and/or audio output devices 160 where each visual and/or audio output device 160 is operated by respective one of responders 150 assigned to the incident scene 140. Similarly, the system 100 may include multiple electronic computing devices 110 each supporting or serving a different geographical area/incident scene or a different communication system or alternatively executing the processes (e.g., process 300 and process 600 shown in FIGS. 3 and 6, respectively) described herein in a distributed manner.

In accordance with some embodiments, responder 150 may be associated with his or her own multimedia capture device 165 (e.g., a dedicated body-worn camera or a camera that is integrated with the visual and/or audio output device 160) that is separate from the multimedia capture devices 120 that are deployed at or near the incident scene 140. The multimedia capture device 165 of the responder 150 may be activated by the electronic computing device 110 to capture real-time multimedia streams corresponding to the incident scene 140 upon arrival of the responder 150 at the incident scene 140.

The electronic computing device 110 may include one or more wired or wireless communication interfaces for communicating with the multimedia capture devices 120, 165, visual and/or audio output device 160, database 170, and other communication devices operating in the system 100 via the communication network 130. The communication network 130 includes wireless and wired connections. For example, the communication network 130 may be implemented using a wide area network, such as the Internet, a local area network, such as a Wi-Fi network, and personal area or near-field networks, for example a Bluetooth™ network. Portions of the communications network 130 may include a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof.

In accordance with embodiments, the electronic computing device 110 processes multimedia streams captured corresponding to the incident scene 140 and presents prioritized digital statements to responders 150 assigned to respond to the incident. In operation, the electronic computing device 110 captures, via one or more multimedia capture devices 120, one or more first real-time multimedia streams corresponding to the incident scene 140. In accordance with embodiments, the first real-time multimedia streams represent streams that are captured from the incident scene 140 prior to the arrival of the responder 150 to the incident scene 140. The electronic computing device 110 then converts the first real-time multimedia streams into a plurality of digital statements. The electronic computing device 110 further tags each of the plurality of digital statements at least one of a plurality of identities (also referred to as person identities) of persons 145 present at the incident scene 140. The person identities are determined based on at least one biometric attribute extracted from the first real-time multimedia streams. In other words, the electronic computing device 110 processes the first real-time multimedia streams and detects a plurality of users or persons 145-1, 145-2 . . . 145-N as being present at the incident scene 140 prior to the arrival of the responder 150 to the incident scene 140. When the responder 150 arrives at the incident scene 140, the electronic computing device 110 captures one or more second real-time multimedia streams via the multimedia capture devices 120 (i.e., multimedia capture devices 120 pre-deployed at the incident scene 140) and/or the multimedia capture device 165 (i.e., multimedia capture device 165 carried and/or operated by the responder 150). In other words, the second real-time multimedia streams represent multimedia streams that are captured from the incident scene 140 after the responder 150 has arrived at the incident scene 140. The electronic computing device 110 then extracts at least one biometric attribute from the one or more second real-time multimedia streams to determine a person identity of a person present at the incident scene 140 after the responder 150 has arrived at the incident scene 140. When the electronic computing device 110 determines that the person identity of the person present at the incident scene 140 (i.e., after the arrival of the responder 150) matches with a particular one of the plurality of person identities of persons 145 present at the incident scene 140 (i.e., before the arrival of the responder 150), the electronic computing device 110 selects one or more of the plurality of digital statements that are tagged to a particular one (i.e., persons who were present at the incident scene prior to as well as after the arrival of the responder to the incident scene 140) of the plurality of person identities. The electronic computing device 110 generates a post-arrival notification for the responder 150 indicating a presence of one or more persons (e.g., selected from persons who were present at the incident scene prior to as well as after the arrival of the responder to the incident scene 140) at the incident scene 140. The post-arrival notification includes the selected one or more of the plurality of digital statements that are tagged to the person identity of the one or more persons present at the incident scene 140. The electronic computing device 110 then provides a visual and/or audio output including the post-arrival notification via a visual and/or audio output device 160 operated by one or more responders 150.

Figure 2:
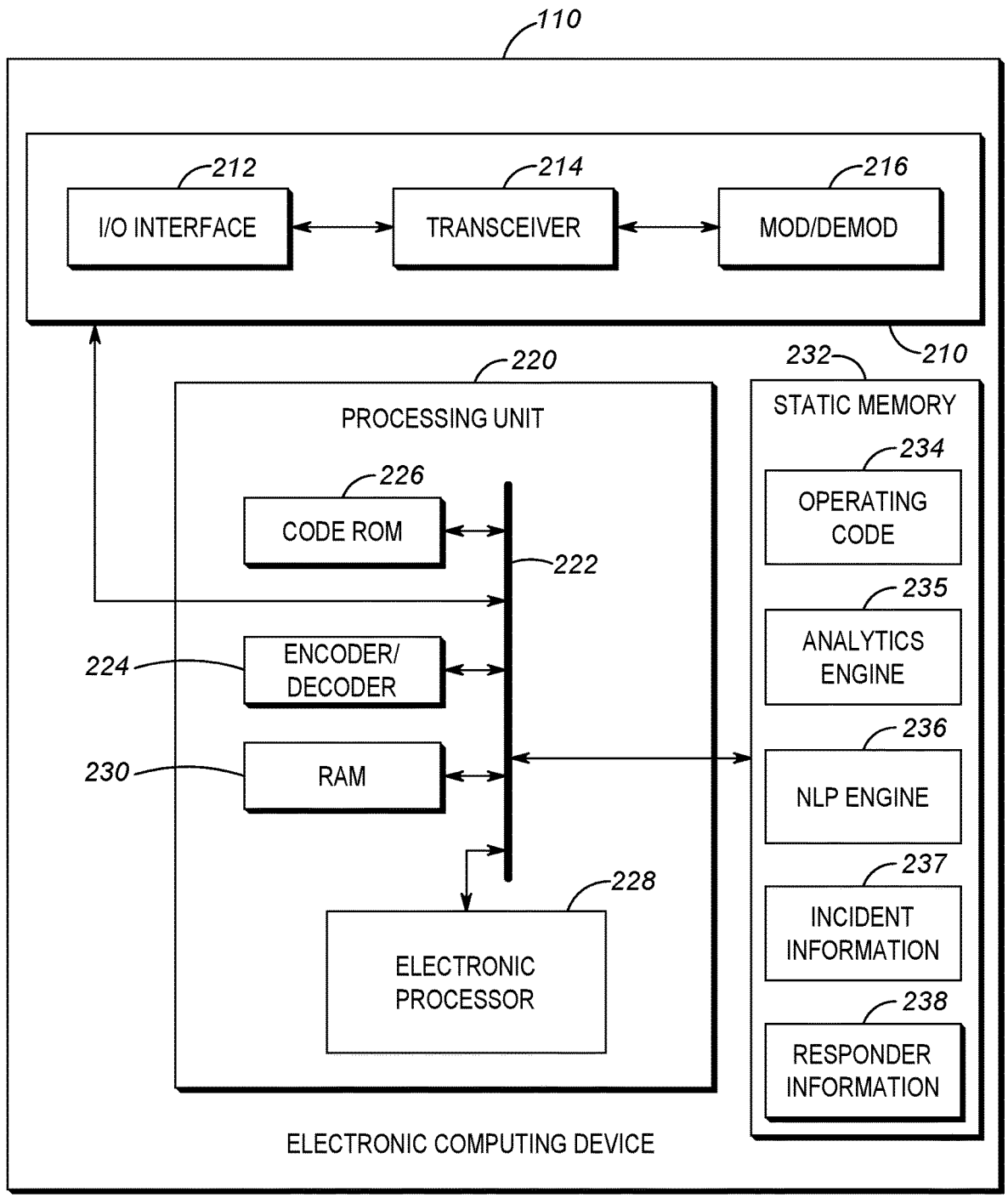
FIG. 2 is a block diagram of an electronic computing device shown in FIG. 1 in accordance with some embodiments.

FIG. 2 is an example functional block diagram of an electronic computing device operating within the system 100 in accordance with some embodiments. The electronic computing device performs the functions of the electronic computing device 110 shown in FIG. 1 and may be embodied in computing devices not illustrated in FIG. 1, and/or may be a distributed computing device across two or more of the foregoing (or multiple of a same type of one of the foregoing) and linked via a wired and/or wireless communication link(s). In one embodiment, one or more functions of the electronic computing device 110 may be executed at the visual and/or audio output device 160 associated with the responder 150. While FIG. 2 represents an electronic computing device 110 described above with respect to FIG. 1, depending on the type of electronic computing device 110, the electronic computing device 110 may include fewer or additional components in configurations different from that illustrated in FIG. 2.

As shown in FIG. 2, the electronic computing device 110 includes a communications unit 210 coupled to a common data and address bus 222 of a processing unit 220. The communications unit 210 sends and receives data to and from other devices (e.g., multimedia capture devices 120, 165, visual and/or audio output device 160, database 170 etc.,) in the system 100. The communications unit 210 may include one or more wired and/or wireless input/output (I/O) interfaces 212 that are configurable to communicate with other devices in the system 100. For example, the communications unit 210 may include one or more wireless transceivers 214, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 210 may additionally or alternatively include one or more wireline transceivers 214, such as an Ethernet transceiver, a USB transceiver, or similar transceiver configurable to communicate via a twisted pair wire, a coaxial cable, a fiber-optic link, or a similar physical connection to a wireline network. The transceiver 214 is also coupled to a combined modulator/demodulator 216.

The processing unit 220 may include an encoder/decoder 224 with a code Read Only Memory (ROM) 226 coupled to the common data and address bus 222 for storing data for initializing system components. The processing unit 220 may further include an electronic processor 228 (for example, a microprocessor, a logic circuit, an application-specific integrated circuit, a field-programmable gate array, or another electronic device) coupled, by the common data and address bus 222, to a Random Access Memory (RAM) 230 and a static memory 232. The electronic processor 228 may generate electrical signals and may communicate signals through the communications unit 210, such as for receipt by the visual and/or audio output device 160 associated with a responder 150. The electronic processor 228 has ports for coupling to the other components (e.g., electronic display, user input interface device, microphone, camera, speaker, and the like) within the electronic computing device 110.

Figure 3:
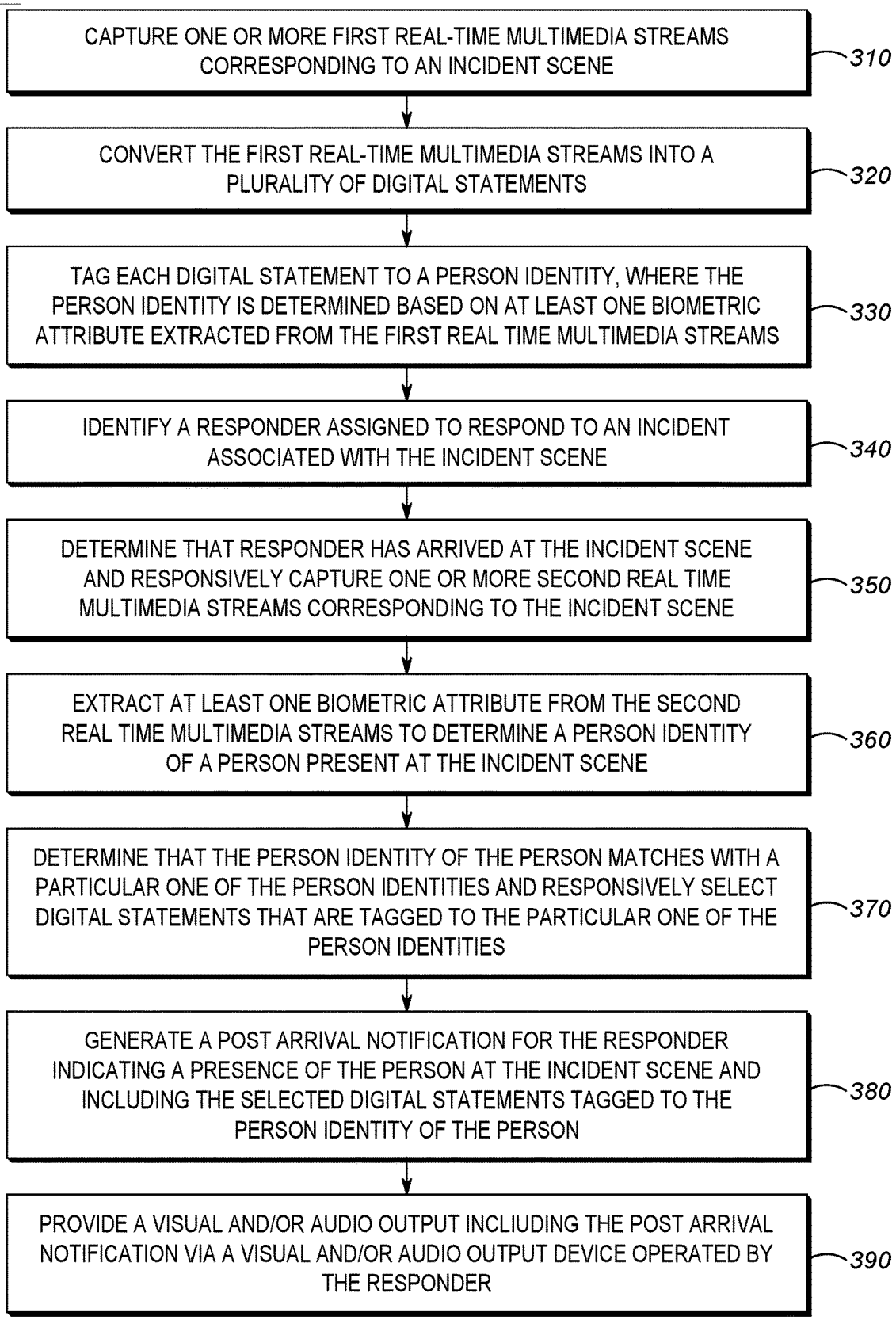
FIG. 3 illustrates a flowchart of a process for presenting statements captured at an incident scene in accordance with some embodiments.
Figure 6:
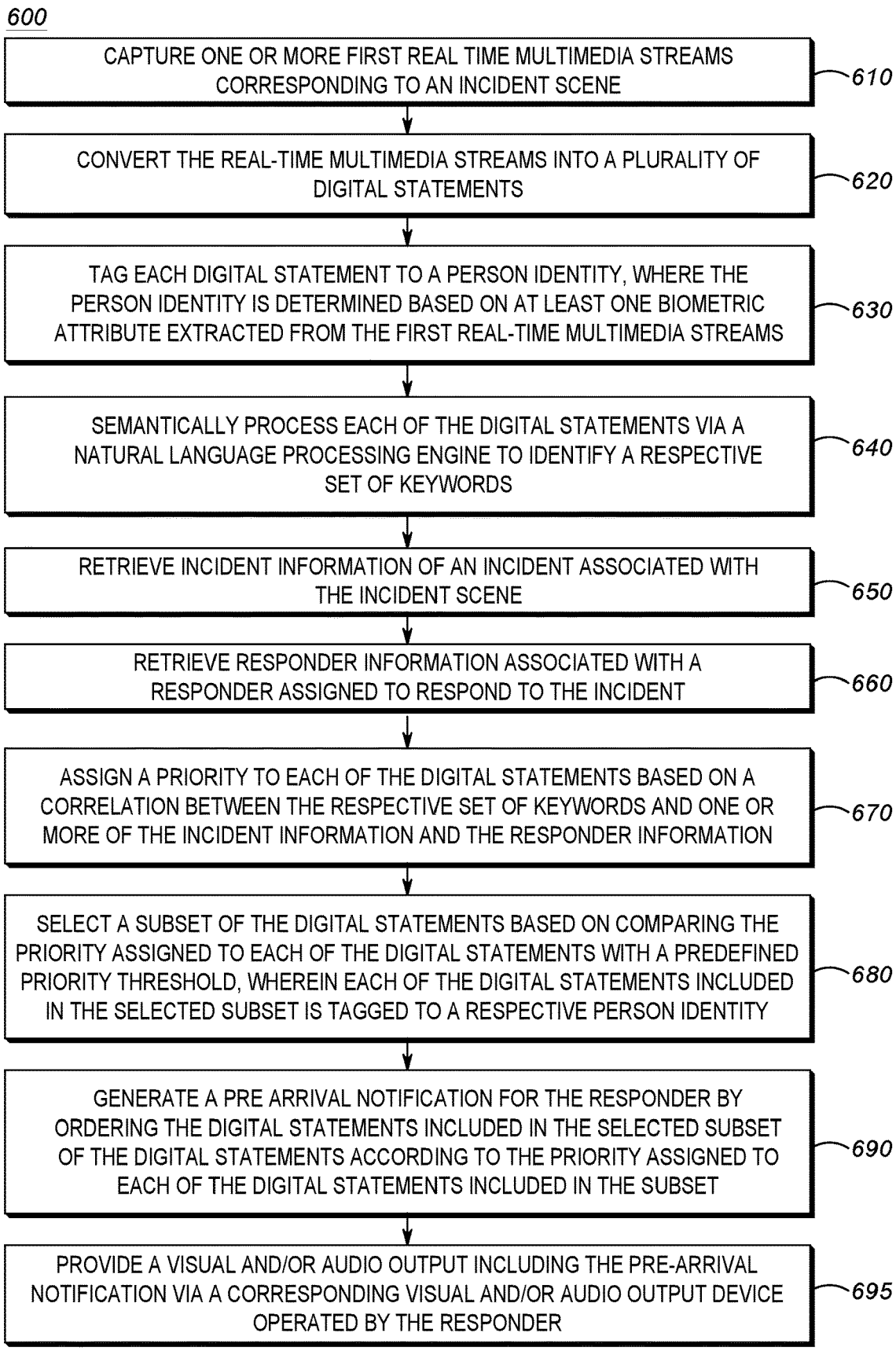
FIG. 6 illustrates a flowchart of another process for presenting statements captured at an incident scene in accordance with some embodiments.

Static memory 232 may store operating code 234 for the electronic processor 228 that, when executed, performs one or more of the blocks set forth in FIGS. 3 and 6 and the accompanying text(s). The static memory 232 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

The static memory 232 may store an analytics engine 235 that includes codes, which when executed by the electronic processor 228, processes multimedia streams captured by the multimedia capture devices 120, 165 to determine biometric attributes of persons 145 present at the incident scene 140. As an example, the biometric attribute extracted from the multimedia streams may represent a face characteristic, gait characteristic, or voice signature of a person 145 that can uniquely identify an identity of the person 145. The analytics engine 235 may include an audio analytics engine that processes audio portions of the multimedia streams captured at the incident scene 140 to extract and associate a unique voice signature to a person 145 present at the incident scene 140. The analytics engine 235 may further include a video analytics engine that may include one or more object classifiers that may be particularly trained to identify an instance of a person 145 or a biometric attribute of a person present at the incident scene 140. The video analytics engine processes video portions of the multimedia streams captured at the incident scene 140 to extract and associate a unique biometric attribute such as a face characteristic to a person 145 present at the incident scene 140.

The static memory 232 further stores a natural language processing (NLP) engine 236 that includes executable codes, which when executed by the electronic processor 228, processes real-time multimedia streams captured by the multimedia capture devices 120, 165 to convert the real-time multimedia streams into a plurality of digital statements. For example, the NLP engine 236 semantically processes the multimedia streams to convert the audio and/or video portions of the multimedia streams into a digital text string. The digital text string may include a text-based description of the audio and/or video of one or more persons 145 present at the incident scene 140. For example, the text-based description may correspond to the auditory record of statements (e.g., describing the incident) made by a person during a conversation with another person at the incident scene 140. Additionally, or alternatively, the digital text string may include text representative of the visual representation (e.g., sign language, hand written note) of statements made by a person during a conversation with another person at the incident scene 140. The NLP engine may include a speech-to-text converter to convert audio statements made by persons 145 present at the incident scene 140 into digital statements. In some embodiments, the video analytics engine 235 may include a lip reading algorithm to process video-only multimedia streams (i.e., multimedia streams without any audio portions) or audio-video streams with loud background noise or unintelligible speech in order to extract digital statements corresponding to speeches uttered by persons 145 present at the incident scene 140. In any case, each digital statement is tagged to a person identity (e.g., name of the person, if available, or other unique identifier or number, if name is not available) of a person from whom the digital statement is captured.

The static memory 232 may further store incident information 237 and responder information 238. As an example, the incident information 237 includes incident identifier, type of the incident, severity of the incident, and location of the incident associated with the incident scene 140. The responder information 238 includes information about one or more responders assigned to respond to the incident. As an example, the responder information 238 of each responder 150 includes one or more of responder identifier, incident to which the responder 150 is assigned, current responder location, rank of the responder 150, role of the responder 150, agency to which the responder 150 is affiliated with, skill level of the responder 150, experience of the responder 150, equipment in possession of the responder 150, and the like. In accordance with embodiments, the electronic computing device 110 determines which digital statements are to be prioritized for presenting to a particular responder 150 based on one or more of the incident information 237 and responder information 238.

Turning now to FIG. 3, a flowchart diagram illustrates a process 300 of presenting statements captured at an incident scene 140. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. An electronic computing device 110 shown in FIG. 1 and/or FIG. 2, and embodied as a singular computing device or distributed computing device may execute process 300 via an electronic processor 228 implemented at the electronic computing device 110.

The electronic computing device 110 may execute the process 300 at power-on, at some predetermined periodic time period thereafter, in response to a trigger raised locally at the electronic computing device 110 via an internal process or via an input interface (e.g., input interface 212) or in response to a trigger from an external device (e.g., dispatch computer) to which the electronic computing device 110 is communicably coupled, among other possibilities. As an example, the electronic computing device 110 is programmed to automatically trigger execution of the process 300 when an incident is detected at an incident scene 140, for example, based on information received from a caller reporting the incident or based on processing and detecting anomalies in real-time multimedia streams periodically captured corresponding to different locations. As another example, the electronic computing device 110 may begin executing the process 300 of presenting statements captured at an incident scene 140 only in response to detecting a predefined user input received at the electronic computing device 110 or in response to a communication received from a dispatch computer.

The process 300 of FIG. 3 need not be performed in the exact sequence as shown and likewise various blocks may be performed in different order or alternatively in parallel rather than in sequence. The process 300 may be implemented on variations of the system 100 of FIG. 1 as well.

Figure 4:
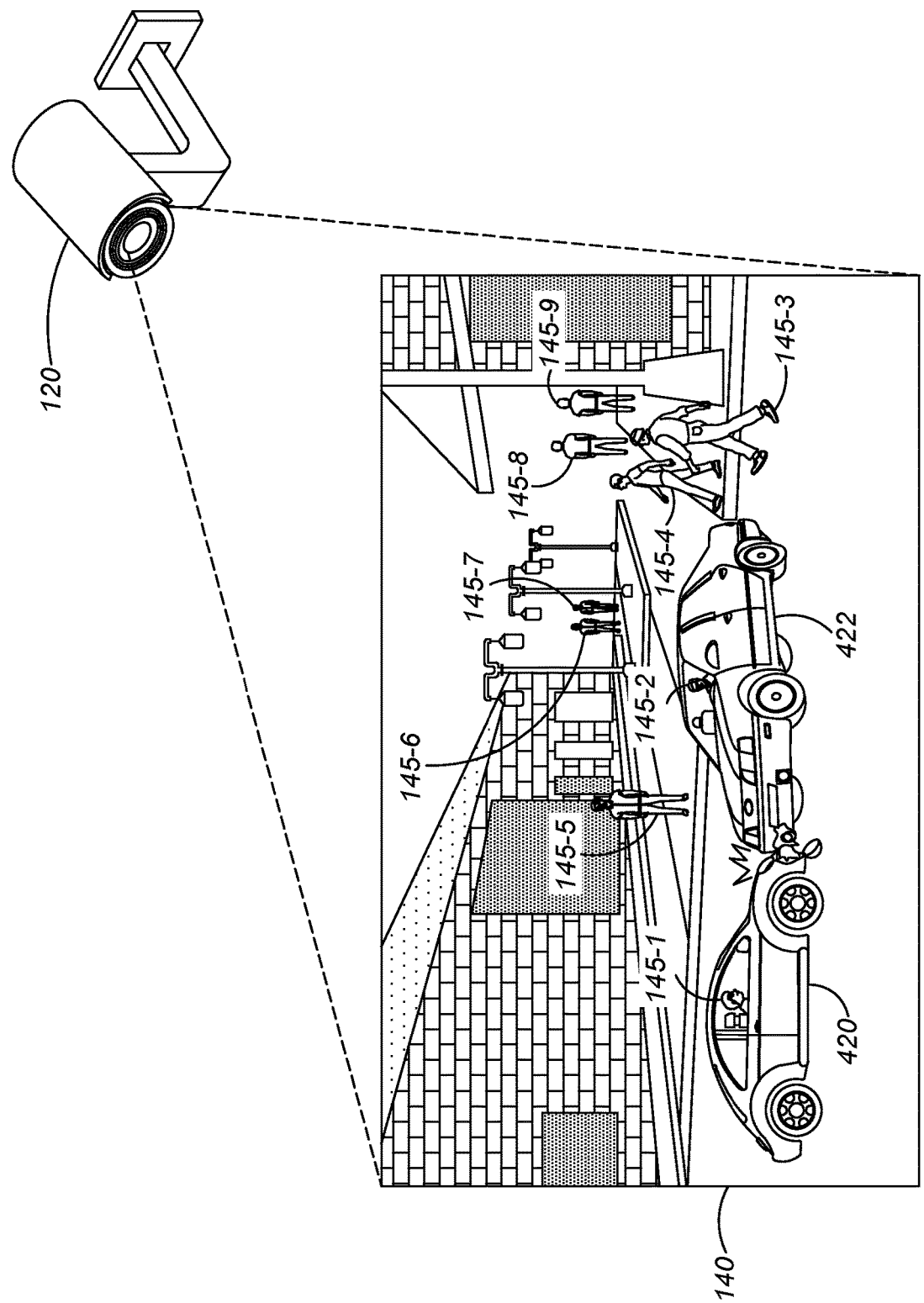
FIG. 4 illustrates an example of an incident scene in which the embodiments described herein can be advantageously implemented in accordance with some embodiments.
Figure 5:
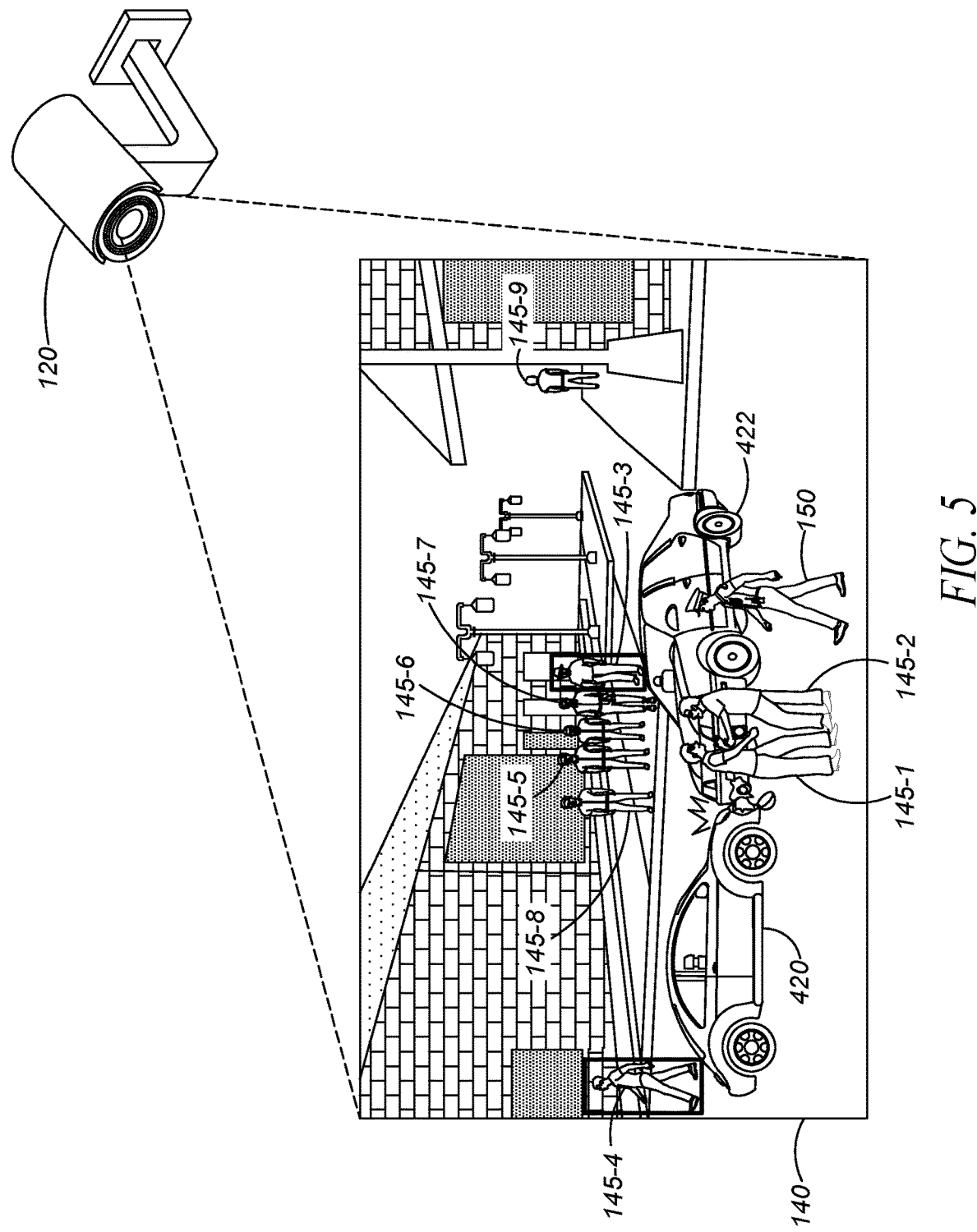
FIG. 5 illustrates an example of the incident scene after the arrival of an assigned responder in accordance with some embodiments.

The process 300 will be described below with reference to an example incident scene 140 shown in FIGS. 4 and 5. FIG. 4 shows a snapshot of an incident scene 140 prior to the arrival of one or more responders 150 to the incident scene 140. FIG. 5 shows a snapshot of an incident scene 140 after the arrival of one or more responders 150 to the incident scene 140.

At block 310, the electronic computing device 110 captures, via one or more multimedia capture devices 120, one or more first real-time multimedia streams corresponding to an incident scene 140. In accordance with embodiments, the electronic computing device 110 begins to capture and process first real-time multimedia streams during or immediately after the occurrence of the incident, but prior to the arrival of a responder 150 to the incident scene 140. In other words, the first real-time multimedia streams represent multimedia streams that are captured prior to the arrival of the responder 150 to the incident scene 140. The first real-time multimedia streams may include audio and/or video streams of persons 145 present at or near the incident scene 140.

As illustrated by an example shown in FIG. 4, an incident such as a vehicle collision involving a first vehicle 420 and a second vehicle 422 occurs at an incident scene 140. One or more multimedia capture devices 120 capture first real-time multimedia streams (e.g., video streams) corresponding to the incident scene 140 during or immediately after the collision. In the example shown in FIG. 4, persons 145-1 and 145-2 represent drivers of the two vehicles 420, 422 respectively involved in the vehicle collision. Persons 145-3, 145-4 . . . 145-9 represent bystanders, onlookers, pedestrians etc., present at the incident scene 140 at or around the time of the collision.

At block 320, the electronic computing device 110 converts the first real-time multimedia streams into a plurality of digital statements. In accordance with embodiments, the electronic computing device 110 processes the first real-time multimedia streams using the NLP engine 236 to convert the audio and/or video portions of the multimedia streams into a digital text string representing a text-based description of the audio and/or video of one or more persons 145 present at the incident scene 140. For example, the text-based description may correspond to an auditory record of statements (e.g., describing the incident) made by a person during a conversation with another person at the incident scene 140. Additionally, or alternatively, the digital text string may include text representative of the visual representation (e.g., sign language, hand written note) of statements made by a person during a conversation with another person at the incident scene 140. The NLP engine 236 may include a speech-to-text converter to convert audio statements made by persons 145 present at the incident scene 140 into digital statements. In some embodiments, the electronic computing device 110 may employ video analytics engine 235 that uses a lip reading algorithm to process video-only multimedia streams (i.e., multimedia streams without any audio portions) or audio-video streams with loud background noise or unintelligible speech to extract digital statements corresponding to speeches uttered by persons 145 present at the incident scene 140.

In the example shown in FIG. 4, assume that the first real-time multimedia streams captured corresponding to the incident scene 140 include conversations between persons 145-3, 145-4 present at the incident scene 140 at the time of vehicle collision. In this case, the electronic computing device 110 converts the conversations (as captured in the first real-time multimedia streams) between persons 145-3, 145-3 into a plurality of digital statements.

At block 330, the electronic computing device 110 tags each of the plurality of digital statements to at least one of a plurality of person identities of persons 145 present at the incident scene 140. Each of the person identities are determined by the electronic computing device 110 based on at least one biometric attribute extracted from the first real-time multimedia streams.

In the example shown in FIG. 4, the electronic computing device 110 may process the first real-time multimedia streams captured by the one or more multimedia capture devices 120 corresponding to the incident scene 140 and further may detect persons 145-1, 145-2 . . . 145-9 as being present at the incident scene 140. In accordance with some embodiments, the electronic computing device 110 may process the first real-time multimedia streams using analytics engine 235 to identify persons 145 present at the incident scene 140. In accordance with embodiments, the electronic computing device 110 further determines one or more biometric attributes of persons 145 present at the incident scene 140 to uniquely identify each person present at the incident scene 140. As an example, the biometric attributes may represent a face characteristic, gait characteristic, or voice signature of a person 145 that can uniquely identify an identity of the person 145. The analytics engine 235 may also include an audio analytics engine that processes audio portions of the multimedia streams captured at the incident scene 140 to extract and associate a unique voice signature to a person 145 present at the incident scene 140. The analytics engine 235 may further include a video analytics engine that may include one or more object classifiers that may be particularly trained to identify an instance of a person 145 or a characteristic of a person 145 present at the incident scene 140. The video analytics engine processes video portions of the multimedia streams captured at the incident scene 140 to extract and associate a unique biometric attribute such as a face characteristic to a person 145 present at the incident scene 140. In accordance with some embodiments, the electronic computing device 110 may assign an identity to each person 145 detected as being present at the incident scene 140. If the electronic computing device 110 has access to the identity (e.g., name) of the person detected as being present at the incident scene 140, then the electronic computing device 110 assigns the same identity to the person. For example, the electronic computing device 110 may compare the biometric attribute (e.g., face characteristic) extracted from the multimedia streams captured corresponding to the incident scene 140 with pre-stored identity information (e.g., stored in the database 170) containing a list of known identities (e.g., persons 'X', 'Y', 'Z' etc.,) of persons 145 and corresponding pre-stored biometric attributes. If the biometric attribute extracted from the first real-time multimedia streams matches with a biometric attribute included in the pre-stored identity information, the electronic computing device 110 assigns a corresponding known identity to the person 145 detected as being present at the incident scene 140. Otherwise, if the electronic computing device 110 does not have access to the known identity of the person 145 detected as being present at the incident, then the electronic computing device 110 creates a new identity (e.g., a new name or a new number) to uniquely associate a person with a particular biometric attribute.

In any case, after the electronic computing device 110 has identified the identities of the persons 145 present at the incident scene 140, the electronic computing device 110 tags each of the digital statements (extracted from the first real-time multimedia streams at block 320) to at least one of the plurality of person identities of persons 145 detected as being present at the incident scene 140. In the example shown in FIG. 4, suppose the conversations between persons 145-3, 145-4 captured in the first real-time multimedia streams are converted into a first digital statement and a second digital statement at block 320, the electronic computing device 110 may tag the first digital statement with an identity (e.g., a label such as 'X') of person 145-3 and further tag the second digital statement with an identity (e.g., a label such as 'Y') of person 145-4.

At block 340, the electronic computing device 110 identifies a responder 150 assigned to respond to an incident associated with the incident scene 140. In accordance with embodiments, the electronic computing device 110 may access responder information 238 identifying one or more responders 150 assigned to respond to the incident associated with the incident scene 140. The electronic computing device 110 further monitors the current location of the one or more responders 150 assigned to respond to the incident in order to determine whether the one or more responders 150 have arrived at the incident scene 140. In one embodiment, the electronic computing device 110 periodically queries a location tracking device (e.g., a visual and/or audio output device 160 with global positioning system (GPS)) associated with the responder 150 to provide a current location of the responder 150. In response, the responder's 150 location tracking device 160 may provide a current location of the responder 150. When the current location matches with a location of the incident scene 140, the electronic computing device 110 determines that the responder 150 has arrived at the incident scene 140. Additionally or alternatively, in one embodiment, the electronic computing device 110 may continue to monitor and process real-time multimedia streams (using the analytics engine 235 and NLP engine 236) captured by the one or more multimedia capture devices 120 deployed at or near the incident scene 140 to determine whether the responder 150 has arrived at the incident scene 140. In this embodiment, the electronic computing device 110 may access identities (including biometric attributes) of the one or more responders 150 from the responder information 238. The electronic computing device 110 further compares the identities of assigned responders 150 with identities of persons 145 (extracted from multimedia streams received from the multimedia capture devices 120) detected as being currently present at the incident scene 140. If the identity of assigned responders 150 matches with the identity of any of the persons 145 detected as being currently present at the incident scene 140, then the electronic computing device 110 detects that a particular responder 150 assigned to respond to the incident has arrived at the incident scene 140. In the example shown in FIG. 5, the snapshot of the incident scene 140 shows that the responder 150 has arrived at the incident scene 140.

At block 350, when the electronic computing device 110 determines that the responder 150 assigned to respond to the incident has arrived at the incident scene 140, the electronic computing device 110 captures one or more second real-time multimedia streams corresponding to the incident scene 140 via one or more multimedia capture devices 120. The second real-time multimedia capture streams represent multimedia streams that are captured after the responder 150 has arrived at the incident scene 140. In one embodiment, the electronic computing device 110 may also capture the second real-time multimedia streams corresponding to the incident scene 140 via the multimedia capture device 165 (e.g., a body-worn camera) carried or operated by the responder 150.

At block 360, the electronic computing device 110 extracts at least one biometric attribute from the second real-time multimedia streams to determine a person identity of a person present at the incident scene 140. As described with reference to block 330, the electronic computing device 110 may similarly process the second real-time multimedia streams using one or more of the analytics engine 235 and NLP engine 236 to extract one or more biometric attributes and detect the presence of one or more persons 145 at the incident scene 140 upon the arrival of the responder 150 at the incident scene 140. As an example, the electronic computing device 110 may extract biometric attributes representing a face characteristic, gait characteristic, or voice signature of persons 145 from the second real-time multimedia streams. As illustrated by the example shown in FIG. 5, the electronic computing device 110 determines, from the second real-time multimedia streams, identities of persons 145-1, 145-2, 145-3, 145-5, 145-6, 145-7, 145-8, and 145-9 who are present at the incident scene 140 after the arrival of the responder 150 at the incident scene 140.

At block 370, the electronic computing device 110 determines whether the identity of one or more of the persons 145 determined from the second real-time multimedia streams (i.e., captured after the arrival of the responder 150 at the incident scene 140) matches with the identity of one or more of the persons 145 determined from the first real-time multimedia streams (i.e., captured before the arrival of the responder 150 at the incident scene 140). When the identity of a person determined from the second real-time multimedia streams matches with the identity of one or more persons 145 determined from the first real-time multimedia streams, the electronic computing device 110 selects one or more of the digital statements that are tagged to the identity of the matching person. In the example shown in FIGS. 4 and 5, persons 145-3 and 145-4 are determined as being present at the incident scene 140 at both times i.e., prior to the arrival of the responder 150 at the incident scene 140 as shown in FIG. 4 as well as after the arrival of the responder 150 at the incident scene 140 as shown in FIG. 5. In this example, assume that a first digital statement is captured based on the speech content associated with person 145-3 and further tagged to person 145-3 and a second digital statement is captured based on the speech content associated with person 145-4 and further tagged to person 145-4. In this case, the electronic computing device 110 determines that the identities of persons 145-3 and 145-4 captured from the second real-time multimedia streams after the arrival of the responder 150 at the incident scene 140 matches with the identities of the persons 145-3 and 145-4 captured from the first real-time multimedia streams prior to the arrival of the responder 150 at the incident scene 140. Accordingly, in the example shown in FIG. 5, at block 370, the electronic computing device 110 may select the first digital statement tagged to the identity of person 145-3. Additionally or alternatively, at block 370, the electronic computing device 110 may select the second digital statement tagged to the identity of person 145-4.

In accordance with some embodiments, the electronic computing device 110 assigns a priority to each of the digital statements extracted at block 320. Each of the digital statements may be tagged to the identity of the same person or a different person. In these embodiments, the electronic computing device 110 semantically processes, via the NLP engine 236, each of the plurality of digital statements to identify a respective set of keywords. The electronic computing device 110 then assigns a priority to each of the digital statements by correlating the respective set of keywords with one or more of the incident information and the responder information. In the example shown in FIG. 4, assume that the first real-multimedia streams captured from the incident scene 140 prior to the arrival of the responder 150 to the incident scene 140 contains conversations between persons 145-3 and 145-4 describing the vehicle collision. Further, assume that the electronic computing device 110 has extracted three digital statements including a first digital statement (e.g., a statement indicating injuries suffered by driver 145-1) from person 145-3, a second digital statement (e.g., a statement indicating that the driver 145-2 is at fault for the vehicle collision) from person 145-4, and further a third digital statement (e.g., a statement indicating a weather condition at the time of collision) from person 145-3. Further assume that a responder 150 dispatched to respond to the vehicle collision is assigned the role of a paramedic. In this case, information relating to injuries suffered by a victim may be more relevant to a responder 150 assigned to the role of a paramedic. The electronic computing device 110 may accordingly assign a higher priority to a first digital statement tagged to a person 145-3 than a second digital statement tagged to a person 145-4 or a third digital statement tagged to the person 145-3 based on one or more of the incident information 237 (e.g., based on severity type and severity of the incident) or the responder information 238 (e.g., based on the role of the responder 150). On the other hand, when a responder 150 is assigned the role of an investigative officer, information about the cause of the vehicle collision may be relevant to the responder 150 assigned to the role of the investigating officer. In this case, the electronic computing device 110 may accordingly assign a higher priority to a second digital statement tagged to a person 145-4 or a third digital statement tagged to a person 145-3 than the first digital statement tagged to the person 145-3.

At block 380, the electronic computing device 110 generates a post-arrival notification for the responder 150 indicating a presence of the person (e.g., person 145-3) at the incident scene 140. In addition, the post-arrival notification includes the one or more selected digital statements that are tagged to the identity of the person (e.g., person 145-3) present at the incident scene 140. The post-arrival notification may further include an indication that the selected digital statements were captured from the person present at the incident scene 140 prior to the arrival of the responder 150 at the incident scene 140. In case multiple persons (e.g., person 145-3 and person 145-4) are detected as being present at the incident scene 140, the electronic computing device 110 may generate multiple post-arrival notifications each separately indicating the presence of the respective persons and further including the respective digital statements tagged to the respective persons. Alternatively, the electronic computing device 110 may prioritize digital statements tagged to one particular person over the other person based on one or more of the incident information 237 or responder information 238. Further, the electronic computing device 110 may prioritize one digital statement tagged to a particular person 145-3 over another digital statement tagged to the same person 145-3. For example, when the responder 150 is assigned the role of a paramedic, the electronic computing device 110 may generate a post-arrival notification indicating the presence of person 145-3 at the incident scene 140 and further including a first digital statement (e.g., a statement indicating injuries suffered by driver 145-1) tagged to the person 145-3, but not a third digital statement (e.g., a statement indicating a weather condition at the time of collision) tagged to the same person 145-3. In this example, the electronic computing device 110 may refrain from indicating the presence of the person 145-4 in the post-arrival notification in response to determining that the priority assigned to the first digital statement tagged to the person 145-3 is higher than the priority assigned to the second digital statement tagged to the person 145-4. As a further example, when a responder 150 is assigned the role of an investigative officer, the electronic computing device 110 may generate a post-arrival notification indicating the presence of person 145-4 at the incident scene 140 and further including a second digital statement (indicating that the driver 145-2 is at fault for the vehicle collision) tagged to person 145-3, but not a first digital statement (e.g., a statement indicating injuries suffered by driver 145-1) tagged to the person 145-3 or a third digital statement (e.g., a statement indicating a weather condition at the time of collision) tagged to the person 145-3. In this example, the electronic computing device 110 may refrain from indicating the presence of the person 145-3 in the post-arrival notification in response to determining that the priority assigned to the second digital statement tagged to the person 145-4 is higher than the priority assigned to the first digital statement tagged to the person 145-3.

At block 390, the electronic computing device 110 provides a visual and/or audio output including the post-arrival notification via a visual and/or audio output device 160 operated by the responder 150. For example, the electronic computing device 110 may transmit the post-arrival notification generated at block 380 to the visual and/or audio output device 160 operated by the responder 150. The visual and/or audio output device 160 receives the post-arrival notification and in response outputs a visual or audio prompt via a corresponding display (e.g., electronic display) or an audio-output component (e.g., speaker) communicatively coupled to the electronic computing device 110. As an example, when the responder 150 is assigned the role of a paramedic, the visual and/or audio output device 160 operated by the responder 150 may play back a visual prompt corresponding to a digital statement (e.g., a statement indicating injuries suffered by the driver 145-1) made by person 145-3 prior to the arrival of the responder 150 at the incident scene 140. The visual prompt corresponding to the digital statement may be overlaid in the form of a scrolling text, image, video, or graphical format in proximity to a screen space on a display indicating a presence of the person 145-3 at the incident scene 140. The presence of the person 145-3 may be rendered on a display of the visual and/or audio output device 160 substantially in real-time during capturing of a multimedia stream corresponding to the incident scene 140. Further, the visual and/or audio output device 160 may selectively highlight a person present at the incident scene 140 to indicate to the responder 150 about the presence of the person at the incident scene 140 along with providing the digital statement made by the person either via a visual or audio prompt. As an example, when the responder 150 is assigned a role of a paramedic, a digital statement indicating injuries suffered by the driver 145-1 made by person 145-3 may be more relevant for presenting to the responder 150 when compared to a digital statement by person 145-4 indicating who is the cause of the vehicle collision. Accordingly, in this example, the visual and/or audio output device 160 may indicate the presence of person 145-3 (but not the presence of person 145-4) by highlighting video/image portions rendered on the display (e.g., an augmented reality display device) of the visual and/or audio output device 160. As another example, when the responder 150 is assigned a role of an investigative officer, a digital statement by person 145-4 indicating that driver 145-2 is at fault for the vehicle collision may be more relevant for presenting to the responder 150 when compared to a digital statement by person 145-3 indicating injuries suffered by the driver 145-1. Accordingly, in this example, the visual and/or output device may indicate the presence of the person 145-4 (but not the presence of the person 145-3) by highlighting video/image portions rendered on the display of the visual and/or audio output device 160. In another embodiment, the visual and/or audio output device 160 plays back an audio prompt (e.g., via a speaker) corresponding to the digital statement (e.g., a statement indicating injuries suffered by the driver 145-1) made by person 145-3 prior to the arrival of the responder 150 at the incident scene 140.

In one embodiment, the visual and/or audio output device 160 plays back the visual or audio prompt corresponding to the audio description in response to determining that the person (e.g., person 145-3) present at the incident scene 140 is within a field-of-view of the responder 150 operating the visual and/or audio output device 160 or alternatively in response to determining that the person present at the incident scene 140 is located within a predefined distance from the responder 150 operating the electronic computing device 110.

In accordance with some embodiments, the electronic computing device 110 further generates a pre-arrival notification for the responder 150 by prioritizing and ordering the digital statements extracted at block 320 from the first real-time multimedia streams. The pre-arrival notification indicates a notification that is provided to the responder 150 after the responder 150 has been assigned to respond to an incident associated with the incident scene 140 but prior to the arrival of the responder 150 at the incident scene 140. In this embodiment, the electronic computing device 110 assigns a priority to each of the digital statements extracted at block 320 by correlating keywords identified from the respective digital statements with one or more of incident information 237 and responder information 238. The electronic computing device 110 then selects a subset of digital statements based on comparing the priority assigned to each of the digital statements with a predefined priority threshold. The electronic computing device 110 orders the digital statements included in the selected subset of the digital statements according to the priority assigned to each of the digital statements included in the subset. The electronic computing device 110 then generates a pre-arrival notification for the responder 150. The pre-arrival notification includes the selected subset of the digital statements ordered according to the priority assigned to each of the digital statements included in the selected subset. Each digital statement included in the selected subset is further tagged to a person identity of a person corresponding to whom the digital statement from the first real-time multimedia streams is captured. The electronic computing device 110 then provides a visual and/or audio output including the pre-arrival notification via the visual and/or audio output device 160 operated by the responder 150. The pre-arrival notification is provided to the responder 150 prior to the arrival of the responder 150 at the incident scene 140. These embodiments are further described below with reference to FIG. 6.

Now turning to FIG. 6, a flowchart diagram illustrates a process 600 of presenting statements captured at an incident scene 140. While a particular order of processing steps, message receptions, and/or message transmissions is indicated in FIG. 6 as an example, timing and ordering of such steps, receptions, and transmissions may vary where appropriate without negating the purpose and advantages of the examples set forth in detail throughout the remainder of this disclosure. An electronic computing device 110 shown in FIG. 1 and/or FIG. 2, and embodied as a singular computing device or distributed computing device may execute process 300 via an electronic processor 228 implemented at the electronic computing device 110.

The electronic computing device 110 may execute the process 300 at power-on, at some predetermined periodic time period thereafter, in response to a trigger raised locally at the electronic computing device 110 via an internal process or via an input interface (e.g., input interface 212) or in response to a trigger from an external device (e.g., dispatch computer) to which the electronic computing device 110 is communicably coupled, among other possibilities. As an example, the electronic computing device 110 is programmed to automatically trigger execution of the process 300 when an incident is detected at an incident scene 140, for example, based on information received from a caller reporting the incident or based on processing and detecting anomalies in real-time multimedia streams periodically captured corresponding to different locations. As another example, the electronic computing device 110 may begin executing the process 600 of presenting statements captured at an incident scene 140 only in response to detecting a predefined user input received at the electronic computing device 110 or in response to a communication received from a dispatch computer.

The process 600 of FIG. 6 need not be performed in the exact sequence as shown and likewise various blocks may be performed in different order or alternatively in parallel rather than in sequence. The process 600 may be implemented on variations of the system 100 of FIG. 1 as well.

The process 600 will be described below with reference to an example incident scene 140 shown in FIG. 4. At block 610, the electronic computing device 110 captures, via one or more multimedia capture devices 120, one or more first real-time multimedia streams corresponding to an incident scene 140. In accordance with embodiments, the electronic computing device 110 begins to capture and process first real-time multimedia streams during or immediately after the occurrence of the incident, but prior to the arrival of a responder 150 to the incident scene 140. In other words, the first real-time multimedia streams represent multimedia streams that are captured prior to the arrival of the responder 150 to the incident scene 140. The first real-time multimedia streams may include audio and/or video streams of persons 145 present at or near the incident scene 140.

As illustrated by an example shown in FIG. 4, an incident such as a vehicle collision involving a first vehicle 420 and a second vehicle 422 occurs at an incident scene 140. One or more multimedia capture devices 120 capture first real-time multimedia streams (e.g., video streams) corresponding to the incident scene 140 during collision or immediately after the collision. In the example shown in FIG. 4, persons 145-1 and 145-2 represent drivers of the two vehicles 420, 422 respectively involved in the vehicle collision. Persons 145-3, 145-4, . . . 145-9 represent bystanders, onlookers, pedestrians etc., who are present at the incident scene 140 at the time of collision or immediately after the collision.

At block 620, the electronic computing device 110 converts the first real-time multimedia streams into a plurality of digital statements. In accordance with embodiments, the electronic computing device 110 processes the first real-time multimedia streams using the NLP engine 236 to convert the audio and/or video portions of the multimedia streams into a digital text string representing a text-based description of the audio and/or video of one or more persons 145 present at the incident scene 140. For example, the text-based description may correspond to an auditory record of statements (e.g., describing the incident) made by a person during a conversation with another person at the incident scene 140. Additionally, or alternatively, the digital text string may include text representative of the visual representation (e.g., sign language, hand written note) of statements made by a person during a conversation with another person at the incident scene 140. The NLP engine 236 may include a speech-to-text converter to convert audio statements made by persons 145 present at the incident scene into digital statements. In some embodiments, the electronic computing device 110 may employ video analytics engine 235 that uses a lip reading algorithm to process video-only multimedia streams (i.e., multimedia streams without any audio portions) or audio-video streams with loud background noise or unintelligible speech in order to extract digital statements corresponding to speeches uttered by persons 145 present at the incident scene 140.

In the example shown in FIG. 4, assume that the first real-time multimedia streams captured corresponding to the incident scene 140 include conversations between persons 145-3, 145-4 present at the incident scene 140 at the time of the vehicle collision. In this case, the electronic computing device 110 converts the conversations (as captured in the first real-time multimedia streams) between persons 145-3, 145-4 into a plurality of digital statements.

At block 630, the electronic computing device 110 tags each of the plurality of digital statements to at least one of a plurality of person identities of persons 145 present at the incident scene 140. Each of the person identities are determined by the electronic computing device 110 based on at least one biometric attribute extracted from the first real-time multimedia streams. In the example shown in FIG. 4, the electronic computing device 110 may process the first real-time multimedia streams captured by the one or more multimedia capture devices 120 corresponding to the incident scene 140 and further may detect persons 145-1, 145-2, . . . 145-9 as being present at the incident scene 140. In accordance with some embodiments, the electronic computing device 110 may process the first real-time multimedia streams using analytics engine 235 to identify persons 145 present at the incident scene 140. In accordance with embodiments, the electronic computing device 110 further determines one or more biometric attributes of persons 145 present at the incident scene 140 to uniquely identify each person present at the incident scene 140. As an example, the biometric attributes may represent a face characteristic, gait characteristic, or voice signature of a person 145 that can uniquely identify an identity of the person 145. The analytics engine 235 may also include an audio analytics engine that processes audio portions of the multimedia streams captured at the incident scene 140 to extract and associate a unique voice signature to a person 145 present at the incident scene 140. The analytics engine 235 may further include a video analytics engine that may include one or more object classifiers that may be particularly trained to identify an instance of a person 145 or a characteristic of a person 145 present at the incident scene 140. The video analytics engine processes video portions of the multimedia streams captured at the incident scene 140 to extract and associate a unique biometric attribute such as a face characteristic to a person 145 present at the incident scene 140. In accordance with some embodiments, the electronic computing device 110 may assign an identity to each person 145 detected as being present at the incident scene 140. If the electronic computing device 110 has access to the identity (e.g., name) of the person detected as being present at the incident scene 140, then the electronic computing device 110 assigns the same identity to the person. For example, the electronic computing device 110 may compare the biometric attribute extracted from the multimedia streams captured corresponding to the incident scene 140 with pre-stored identity information (e.g., stored in the database 170) containing a list of known identities of persons 145 and corresponding pre-stored biometric attributes. If the biometric attribute extracted from the first real-time multimedia streams matches with a biometric attribute included in the pre-stored identity information, the electronic computing device 110 assigns a corresponding known identity to the person 145 detected as being present at the incident scene 140. Otherwise, if the electronic computing device 110 does not have access to the known identity of the person 145 detected as being present at the incident, then the electronic computing device 110 creates a new identity (e.g., a new name or a new number) to uniquely associate a person with a particular biometric attribute.

In any case, after the electronic computing device 110 has identified the identities of the persons 145 present at the incident scene 140, the electronic computing device 110 tags each of the digital statements (extracted from the first real-time multimedia streams at block 620) to at least one of the plurality of person identities of persons 145 detected as being present at the incident scene 140. In the example shown in FIG. 4, suppose the conversations between persons 145-3, 145-4 captured in the first real-time multimedia streams are converted into a first digital statement and a second digital statement at block 320, the electronic computing device 110 may tag the first digital statement with an identity (e.g., a label such as 'X') of person 145-3 and further tag the second digital statement with an identity (e.g., a label such as 'Y') of person 145-4.

At block 640, the electronic computing device 110 semantically processes, via the NLP engine 236, each of the plurality of digital statements to identify a respective set of keywords.

At block 650, the electronic computing device 110 retrieves incident information 237 of an incident associated with the incident scene 140.

At block 660, the electronic computing device 110 retrieves responder information 238 associated with one or more responders 150 assigned to respond to the incident associated with the incident scene 140.

At block 670, the electronic computing device 110 assigns a priority to each of the digital statements by correlating the respective set of keywords with one or more of the incident information 237 and the responder information 238. In the example shown in FIG. 4, assume that the first real-multimedia streams captured from the incident scene 140 prior to the arrival of the responder 150 to the incident scene 140 contain conversations between persons 145-3 and 145-4 describing the vehicle collision. Further, assume that the electronic computing device 110 has extracted three digital statements including a first digital statement (e.g., a statement indicating injuries suffered by driver 145-1) from a person 145-3, a second digital statement (e.g., a statement indicating that the driver 145-2 is at fault for the vehicle collision) from a person 145-4, and further a third digital statement (e.g., a statement indicating a weather condition at the time of collision) from the person 145-3. When the responder 150 is assigned the role of a paramedic, information (i.e., keywords) relating to injuries suffered by a victim may be more relevant to the responder 150 assigned to the role of a paramedic. The electronic computing device 110 may accordingly assign a higher priority to a first digital statement tagged to the person 145-3 than a second digital statement tagged to the person 145-4 or a third digital statement tagged to the person 145-3 based on one or more of the incident information 237 (e.g., based on severity type and severity of the incident) or the responder information 238 (e.g., based on the role of the responder 150). On the other hand, the when responder 150 is assigned the role of an investigative officer, information (i.e., keywords) about the cause of the vehicle collision may be relevant to the responder 150 assigned to the role of the investigating officer. In this case, the electronic computing device 110 may accordingly assign a higher priority to a second digital statement tagged to the person 145-4 or a third digital statement tagged to the person 145-3 than the first digital statement tagged to the person 145-3.

At block 680, the electronic computing device 110 selects a subset of the digital statements based on comparing the priority assigned to each of the digital statements with a predefined priority threshold. For example, when the priority threshold is two, the electronic computing device 110 may select two digital statements with highest priority among all the digital statements. Other possibilities of priority threshold exist as well. In the example shown in FIG. 4, suppose the responder is assigned a role of an investigative officer, the electronic computing device 110 may select, at block 680, the second digital statement made by the person 145-4 indicating that driver 145-2 is at fault for the vehicle collision and further the third digital statement made by the person 145-3 indicating that the weather condition is a cause for the vehicle collision. In this case, the electronic computing device 110 does not select the first digital statement made by person 145-3 indicating injuries suffered by driver 145-1 because the priority assigned to the first digital statement is not higher than the priority assigned to the second and third digital statements. In accordance with embodiments, the selected digital statements are further tagged to the identities of the persons 145 who made the respective statements. For example, the selected second statement made by person 145-4 is tagged to the identity of person 145-4 and the selected third statement made by person 145-3 is tagged to the identity of person 145-3.

At block 690, the electronic computing device 110 generates a pre-arrival notification for the responder 150 by ordering the digital statements included in the subset of digital statements selected at block 680 according to the priority assigned to each of the digital statements included in the subset. For example, assume that a second digital statement made by person 145-4 indicating that driver 145-2 is at fault for the vehicle collision and further the third digital statement made by person 145-3 indicating that the weather condition is a cause for the vehicle collision are selected at block 680. Further assume that the electronic computing device 110 has assigned a higher priority to the second digital statement than the first digital statement. In this case, at block 690, the electronic computing device 110 orders the digital statements in the post-arrival notification such that the second digital statement with higher priority will be output at the visual and/or audio output device 160 of the responder 150 at a higher priority than the third digital statement with lower priority. The pre-arrival notification further tags each of the second and third digital statements to the identities of the persons 145-4, 145-3, respectively.

At block 695, the electronic computing device 110 provides a visual and/or audio output including the pre-arrival notification via a corresponding visual and/or audio output device 160 operated by the responder 150. For example, the electronic computing device 110 may transmit the pre-arrival notification generated at block 690 to the visual and/or audio output device 160 operated by the responder 150. In accordance with embodiment, the visual and/or audio output including the pre-arrival notification is provided to the responder 150 before the responder 150 arrives at the incident scene 140. The visual and/or audio output device 160 receives the post-arrival notification and in response outputs a visual or audio prompt of the digital statements included in the pre-arrival notification via a corresponding display (e.g., electronic display) or an audio-output component (e.g., speaker) communicatively coupled to the electronic computing device 110. Further as instructed in the pre-arrival notification, while providing a visual and/or audio prompt corresponding to the digital statements included in the pre-arrival notification, the visual and/or audio output device 160 may order the digital statements according to the priority assigned to the respective digital statements. The second digital statement with higher priority may be displayed more prominently than the third digital statement. For example, the second digital statement with higher priority may be highlighted on a display of the visual and/or audio output device while the third digital statement may not be highlighted on the display. Additionally or alternatively, the second digital statement with higher priority may be rendered with a larger text size (or positioned at the top) relative to other digital statements including the third digital statement. In another embodiment, the visual and/or audio output device 160 plays back an audio prompt (e.g., via a speaker) corresponding to the digital statement (e.g., a statement indicating injuries suffered by the driver 145-1) made by person 145-3 prior to the arrival of the responder 150 at the incident scene 140.

In accordance with some embodiments, the electronic computing device 110 provides the pre-arrival notification to the responder 150 before the responder 150 arrives at the incident scene 140 and further continues to monitor whether the responder 150 has arrived at the incident scene 140. Further, as previously described with reference to block 350 shown in FIG. 3, when the electronic computing device 110 determines that the responder 150 has arrived at the incident scene 140, the electronic computing device 110 captures, via the one or more multimedia capture devices 120 or at least one other multimedia capture device 165 associated with the responder 150, one or more second real-time multimedia streams corresponding to the incident scene 140. The electronic computing device 110 extracts at least one biometric attribute from the second real-time multimedia streams to determine a person identity of a person present at the incident scene 140. If the person identity of the person present at the incident scene 140 (i.e., after the arrival of the responder 150 at the incident scene 140) matches with a particular one of the plurality of person identities of persons 145 present at the incident scene 140 (i.e., before the arrival of the responder 150 at the incident scene 140), the electronic computing device 110 selects one or more of the plurality of digital statements that are tagged to the particular one of the person identities. Further, as described with reference to block 380 shown in FIG. 3, the electronic computing device 110 generates a post-arrival notification for the responder 150 indicating a presence of the person at the incident scene 140. The post-arrival notification includes the selected one or more of the plurality of digital statements that are tagged to the person identity of the person present at the incident scene 140. Further, as described with reference to block 390 shown in FIG. 3, the electronic computing device 110 provides a visual and/or audio output including the post-arrival notification via the visual and/or audio output device 160 operated by the responder 150.

In accordance with some embodiments, the electronic computing device 110 also converts the second real-time multimedia streams that are captured after the arrival of the responder 150 at the incident scene 140 into one or more second digital statements. The electronic computing device 110 further identifies a particular one of the second digital statements as being tagged to the identity of person present at the incident scene 140. If the electronic computing device 110 detects any inconsistency between the particular one of the second digital statements (i.e., statements tagged to a particular person present at the incident scene 140 after the arrival of the responder 150 at the incident scene 140) and digital statements (i.e., statements tagged to the particular person present at the incident scene 140 prior to the arrival of the responder 150 at the incident scene 140), the electronic computing device 110 generates a second post-arrival notification for the responder 150 indicating the inconsistency between the particular one of the second digital statements and the selected one or more of the digital statements included in the post-arrival notification. The electronic computing device 110 then provides a visual and/or audio output including the second post-arrival notification via the visual and/or audio output device 160 operated by the responder 150. As an example, assume that, prior to the arrival of the responder 150 (e.g., an investigating officer) to the incident scene 140, driver 145-2 shown in FIG. 4 makes a statement admitting that he (i.e., driver 145-2) is at fault for the vehicle collision. Further assume that, after the arrival of the responder 150 at the incident scene 140, the same driver 145-2 shown in FIG. 5 makes a statement indicating that the other driver 145-1 is at fault for the vehicle collision. In this example, the electronic computing device 110 determines the inconsistency (i.e., regarding who is at fault for the vehicle collision) between the statements made by driver 145-2 prior to and after the arrival of the responder 150 at the incident scene 140 and further provides a notification for the responder 150 identifying the inconsistency in the statements made by the driver 145-2.

While embodiments of the present disclosure are described with examples relating to presenting statements captured at public-safety related incident scenes, embodiments of the present disclosure can be also readily adapted for non-public safety use cases such as manufacturing and retail environments where there may be a need to present statements captured from persons present at the incident scenes prior to and after the arrival of officers assigned to investigate such incident scenes in manufacturing and retail environments.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of presenting statements captured at an incident scene, the method comprising:
 capturing, via one or more multimedia capture devices, one or more first real-time multimedia streams corresponding to an incident scene prior to the arrival of a responder to the incident scene;
converting the first real-time multimedia streams into a plurality of digital statements;
tagging each of the plurality of digital statements to at least one of a plurality of person identities of persons present at the incident scene prior to the arrival of the responder to the incident scene, each of the plurality of person identities determined based on at least one biometric attribute extracted from the first real-time multimedia streams;
identifying the responder assigned to respond to an incident associated with the incident scene;
determining that the responder has arrived at the incident scene and responsively capturing, via the one or more multimedia capture devices or at least one other multimedia capture device associated with the responder, one or more second real-time multimedia streams corresponding to the incident scene after the arrival of the responder at the incident scene;
extracting at least one biometric attribute from the second real-time multimedia streams to determine a person identity of a person present at the incident scene after the arrival of the responder at the incident scene;
determining that the person identity of the person present at the incident scene after the arrival of the responder at the incident scene matches with a particular one of the plurality of person identities of persons present at the incident scene prior to the arrival of the responder to the incident scene, and responsively selecting one or more of the plurality of digital statements that are tagged to the particular one of the plurality of person identities of persons present at the incident scene prior to the arrival of the responder to the incident scene;
generating a post-arrival notification for the responder indicating a presence of the person at the incident scene prior to the arrival of the responder to the incident scene, the post-arrival notification including the selected one or more of the plurality of digital statements that are tagged to the person identity of the person; and
providing a visual and/or audio output including the post-arrival notification via a visual and/or audio output device operated by the responder after the arrival of the responder at the incident scene.

2. The method of claim 1, wherein the post-arrival notification further indicates that the selected one or more of the plurality of digital statements were captured from the person prior to the arrival of the responder at the incident scene.

3. The method of claim 1, further comprising:
assigning a priority to each of the plurality of digital statements;
selecting a subset of the digital statements based on comparing the priority assigned to each of the plurality of digital statements with a predefined priority threshold;
ordering the digital statements included in the selected subset of the digital statements according to the priority assigned to each of the digital statements included in the subset;
generating a pre-arrival notification for the responder, the pre-arrival notification including the selected subset of the digital statements ordered according to the priority assigned to each of the digital statements included in the selected subset, wherein each of the digital statements included in the selected subset is tagged to a respective one of the plurality of person identities; and
providing, prior to the arrival of the responder at the incident scene, a second visual and/or audio output including the pre-arrival notification via the visual and/or audio output device operated by the responder.

4. The method of claim 3, wherein assigning comprises:
semantically processing each of the plurality of digital statements via a natural language processing engine to identify a respective set of keywords;
retrieving incident information associated with the incident;
retrieving responder information associated with the responder assigned to respond to the incident; and
assigning the priority to each of the plurality of digital statements by correlating the respective set of keywords with one or more of the incident information and the responder information.

5. The method of claim 4, wherein the responder information includes one or more of a role of the responder, skill level of the responder, experience of the responder, and equipment in possession of the responder.

6. The method of claim 1, further comprising:
extracting at least one other biometric attribute from the second real-time multimedia streams to determine a person identity of a second person present at the incident scene;
determining that the person identity of the second person present at the incident scene matches with a second particular one of the plurality of person identities; and responsively selecting a second one or more of the plurality of digital statements that are tagged to the second particular one of the plurality of person identities;
generating a second post-arrival notification for the responder indicating a presence of the second person at the incident scene, the second post-arrival notification including the selected second one or more of the plurality of digital statements that are tagged to the person identity of the second person; and
providing a second visual and/or audio output including the second post-arrival notification via the visual and/or audio output device operated by the responder.

7. The method of claim 1, further comprising:
extracting at least one other biometric attribute from the second real-time multimedia streams to determine a person identity of a second person present at the incident scene;
determining that the person identity of the second person present at the incident scene matches with a second particular one of the plurality of person identities; and responsively selecting a second one or more of the plurality of digital statements that are tagged to the second particular one of the plurality of person identities;
semantically processing each of the one or more of the plurality of digital statements and the second one or more of the plurality of digital statements via a natural language processing engine to identify a respective set of keywords;
retrieving incident information associated with the incident;
retrieving responder information associated with the responder assigned to respond to the incident; and
assigning a priority to each of the selected one or more of the plurality of digital statements and the second one or more of the plurality of digital statements by correlating the respective set of keywords with one or more of the incident information and the responder information.

8. The method of claim 7, wherein prior to generating the post-arrival notification, the method comprising:
determining whether the priority assigned to the selected one or more of the plurality of digital statements is higher than the priority assigned to the second one or more of the plurality of digital statements.

9. The method of claim 8, wherein generating comprises:
generating the post-arrival notification indicating the presence of the person at the incident scene in response to determining that the priority assigned to the selected one or more of the plurality of digital statements is higher than the priority assigned to the second one or more of the plurality of digital statements.

10. The method of claim 9, further comprising:
refraining from indicating the presence of the second person at the incident scene in the post-arrival notification in response to determining that the priority assigned to the selected one or more of the plurality of digital statements is higher than the priority assigned to the second one or more of the plurality of digital statements.

11. The method of claim 10, further comprising:
identifying at least one other responder assigned to respond to the incident associated with the incident scene;
determining that the at least one other responder has arrived at the incident scene and responsively capturing, via the multimedia capture devices or at least one other multimedia capture device associated with the at least one other responder, one or more third real-time multimedia streams corresponding to the incident scene;
extracting at least one biometric attribute from the third real-time multimedia streams to determine the person identity of the second person present at the incident scene;
generating a post-arrival notification for the at least one other responder indicating the presence of the second person at the incident scene, the post-arrival notification for the at least one other responder including the second one or more of the plurality of digital statements that are tagged to the person identity of the second person; and
providing a visual and/or audio output including the post-arrival notification for the at least one other responder via a second visual and/or audio output device operated by the at least one other responder.

12. The method of claim 1, wherein the at least one other multimedia capture device is a body-worn camera associated with the responder.

13. The method of claim 12, wherein prior to providing, the method further comprising:
determining that the person is present within a predefined distance from the responder.

14. The method of claim 1, wherein the visual and/or audio output device comprises an augmented reality display device, the method comprising:
indicating the presence of the person at the incident scene via the augmented reality display device when the person is within a field-of-view of the augmented reality display device.

15. A system, comprising:
one or more multimedia capture devices; and
an electronic computing device communicatively coupled to the one or more multimedia capture devices, wherein the electronic computing device is configured to:
capture, via the multimedia capture devices, one or more first real-time multimedia streams corresponding to an incident scene prior the arrival of a responder to the incident scene;
convert the first real-time multimedia streams into a plurality of digital statements;
tag each of the plurality of digital statements to at least one of a plurality of person identities of persons present at the incident scene prior to the arrival of the responder to the incident scene, each of the plurality of person identities determined based on at least one biometric attribute extracted from the first real-time multimedia streams;
identify the responder assigned to respond to an incident associated with the incident scene;
determine that the responder has arrived at the incident scene and responsively capture, via the multimedia capture devices or at least one other multimedia capture device associated with the responder, one or more second real-time multimedia streams corresponding to the incident scene after the arrival of the responder at the incident scene;
extract at least one biometric attribute from the second real-time multimedia streams to determine a person identity of a person present at the incident scene after the arrival of the responder at the incident scene;
determine that the person identity of the person present at the incident scene after the arrival of the responder at the incident scene matches with a particular one of the plurality of person identities of persons present at the incident scene prior to the arrival of the responder to the incident scene, and responsively select one or more of the plurality of digital statements that are tagged to the particular one of the plurality of person identities of persons present at the incident scene prior to the arrival of the responder to the incident scene;
generate a post-arrival notification for the responder indicating a presence of the person at the incident scene prior to the arrival of the responder to the incident scene, the post-arrival notification including the selected one or more of the plurality of digital statements that are assigned to the person identity of the person; and
provide a visual and/or audio output including the post-arrival notification via a visual and/or audio output device operated by the responder after the arrival of the responder at the incident scene.

16. The system of claim 15, wherein the electronic computing device is configured to:
assign a priority to each of the plurality of digital statements;
select a subset of the digital statements based on comparing the priority assigned to each of the plurality of digital statements with a predefined priority threshold;
order the digital statements included in the selected subset of the digital statements according to the priority assigned to each of the digital statements included in the subset;
generate a pre-arrival notification for the responder, the pre-arrival notification including the selected subset of the digital statements ordered according to the priority assigned to each of the digital statements included in the selected subset, wherein each of the digital statements included in the selected subset is tagged to a respective one of the plurality of person identities; and provide, prior to the arrival of the responder at the incident scene, a second visual and/or audio output including the pre-arrival notification via the visual and/or audio output device operated by the responder.

17. The system of claim 16, wherein the electronic computing device is configured to:
semantically process each of the plurality of digital statements via a natural language processing engine to identify a respective set of keywords;
retrieving incident information associated with the incident;
retrieving responder information associated with the responder assigned to respond to the incident; and
assign the priority to each of the plurality of digital statements based on a correlation between the respective set of keywords and one or more of the incident information and the responder information.

18. A method of presenting statements captured at an incident scene, the method comprising:
capturing, via one or more multimedia capture devices, one or more real-time multimedia streams corresponding to an incident scene prior to the arrival of a responder to the incident scene;
converting the real-time multimedia streams into a plurality of digital statements;
tagging each of the plurality of digital statements to at least one of a plurality of person identities of persons present at the incident scene prior to the arrival of the responder to the incident scene, each of the plurality of person identities determined based on at least one biometric attribute extracted from the real-time multimedia streams;
semantically processing each of the plurality of digital statements via a natural language processing engine to identify a respective set of keywords;
retrieving incident information of an incident associated with the incident scene;
retrieving responder information associated with the responder assigned to respond to the incident;
assigning a priority to each of the plurality of digital statements based on a correlation between the respective set of keywords and one or more of the incident information and the responder information;
selecting a subset of the digital statements based on comparing the priority assigned to each of the plurality of digital statements with a predefined priority threshold, wherein each of the digital statements included in the selected subset is tagged to a respective one of the plurality of person identities;
generating a pre-arrival notification for the responder by ordering the digital statements included in the selected subset of the digital statements according to the priority assigned to each of the digital statements included in the subset; and
providing a visual and/or audio output including the pre-arrival notification via a visual and/or audio output device operated by the responder before the arrival of the responder to the incident scene.

19. The method of claim 18, further comprising:
determining that the responder has arrived at the incident scene and responsively capturing, via the one or more multimedia capture devices or at least one other multimedia capture device associated with the responder, one or more second real-time multimedia streams corresponding to the incident scene after the arrival of the responder at the incident scene;
extracting at least one biometric attribute from the second real-time multimedia streams to determine a person identity of a person present at the incident scene after the arrival of the responder at the incident scene;
determining that the person identity of the person present at the incident scene after the arrival of the responder at the incident scene matches with a particular one of the plurality of person identities of persons present at the incident scene prior to the arrival of the responder to the incident scene, and responsively selecting one or more of the plurality of digital statements that are tagged to the particular one of the plurality of person identities of persons present at the incident scene prior to the arrival of the responder to the incident scene;
generating a post-arrival notification for the responder indicating a presence of the person at the incident scene prior to the arrival of the responder to the incident scene, the post-arrival notification including the selected one or more of the plurality of digital statements that are tagged to the person identity of the person present at the incident scene; and
providing a second visual and/or audio output including the post-arrival notification via the visual and/or audio output device operated by the responder after the arrival of the responder at the incident scene.

20. The method of claim 19, further comprising:
converting the second real-time multimedia streams into one or more second digital statements;
identifying a particular one of the second digital statements as being tagged to the person identity of the person;
detecting an inconsistency between the particular one of the second digital statements and the selected one or more of the plurality of digital statements;
generating a second post-arrival notification for the responder indicating the inconsistency between the particular one of the second digital statements and the selected one or more of the digital statements included in the post-arrival notification; and
providing a third visual and/or audio output including the second post-arrival notification via the visual and/or audio output device operated by the responder.

* * * * *